United States Patent

[11] 3,623,103

[72] Inventor Charles A. Baldwin
3406 Old Dominion Road, Alexandria, Va. 22305

[21] Appl. No. 856,599
[22] Filed Sept. 10, 1969
[45] Patented Nov. 23, 1971

[54] CONTINUOUSLY INDICATING RADIO DIRECTION FINDER
6 Claims, 9 Drawing Figs.

[52] U.S. Cl. .......... 343/118, 343/119
[51] Int. Cl. .......... G01s 3/70
[50] Field of Search .......... 343/118, 119

[56] References Cited
UNITED STATES PATENTS
3,132,341 5/1964 Fryklund .......... 343/118
3,328,799 6/1967 Green et al. .......... 343/118
FOREIGN PATENTS
1,011,748 6/1952 France .......... 343/119

*Primary Examiner*—Rodney D. Bennett, Jr.
*Assistant Examiner*—R. Kinberg
*Attorney*—Smith, Michael, Bradford & Gardiner

ABSTRACT: A radio direction finder comprising a continuously rotating assembly including a directional receiving antenna and means for generating a pulse upon movement of the antenna past a point of reference, means to detect a null in the reception of a radio signal by the antenna, and means triggered by the reference pulse and terminated by the detected signal to establish an output the magnitude of which is a function of the arc of rotation of the antenna between the point of reference and the null of the received signal. The antenna assembly includes angularly related loop antennas, one of which is associated with a sense antenna and the other of which is independently balanced against ground.

INVENTOR
CHARLES A. BALDWIN

Smith, Michael, Bradford & Gardiner
ATTORNEYS

INVENTOR
CHARLES A. BALDWIN

Smith, Michael, Bradford & Gardiner
ATTORNEYS

INVENTOR.
CHARLES A. BALDWIN
BY
Smith, Michael, Bradford & Gardiner

CONTINUOUSLY INDICATING RADIO DIRECTION FINDER

BACKGROUND OF INVENTION

Radio direction finders including continuously rotating antenna systems have found application in determining the direction of a vehicle carrying the finding equipment from a known point of radio signal transmission for many years. Such systems are exemplified by U.S. Pat. No. 2,232,096 issued Feb. 18, 1941 to F. W. Dane; U.S. Pat. No. 2,848,570 issued Aug. 19, 1958 to Howard W. Cole, Jr.; and more recently by U.S. Pat. No. 3,328,799 issued June 27, 1967 to B. P. Green et al.

Many of the previously known systems involve either elaborate and expensive means for synchronizing a detected null of signal reception with a reference point on the vehicle in order to determine relative bearing, or display inherent inaccuracies which jeopardize the reliability of the device. Further, many of the prior art systems lack convenience or simplicity in the method of readout, thus rendering them excessively complicated for use by small craft or aircraft operators many of whom are not sufficiently trained to cope with a complicated and often confusing readout procedure. The growth in the use of small vehicles, particularly boats, has also created a need for units of this type which are compact in space requirements and create minimal demands on the vehicle power source.

OBJECTS OF INVENTION

The concept of this invention stems from a realization of the aforesaid deficiencies of previously available equipment, and has among its objects the provision of a continuously operating radio direction finder which is characterized by:

1. compact construction,
2. low power demand,
3. readily readable display,
4. improved accuracy,
5. reduced manufacturing cost,
6. minimal moving parts,
7. reliably synchronized antenna and display which tolerates variations in antenna rotational speed,
8. compatibility with commercially available components,
9. simplicity of operation, and
10. reliability of operation free of the need for frequent technical adjustments.

DESCRIPTION OF DRAWINGS

The foregoing and other self-evident advantages and objects of the invention will be better understood by a consideration of the ensuing specification and the accompanying drawings which illustrate preferred embodiments of the invention, and in which.

DESCRIPTION OF INVENTION

Figures 1, 5:
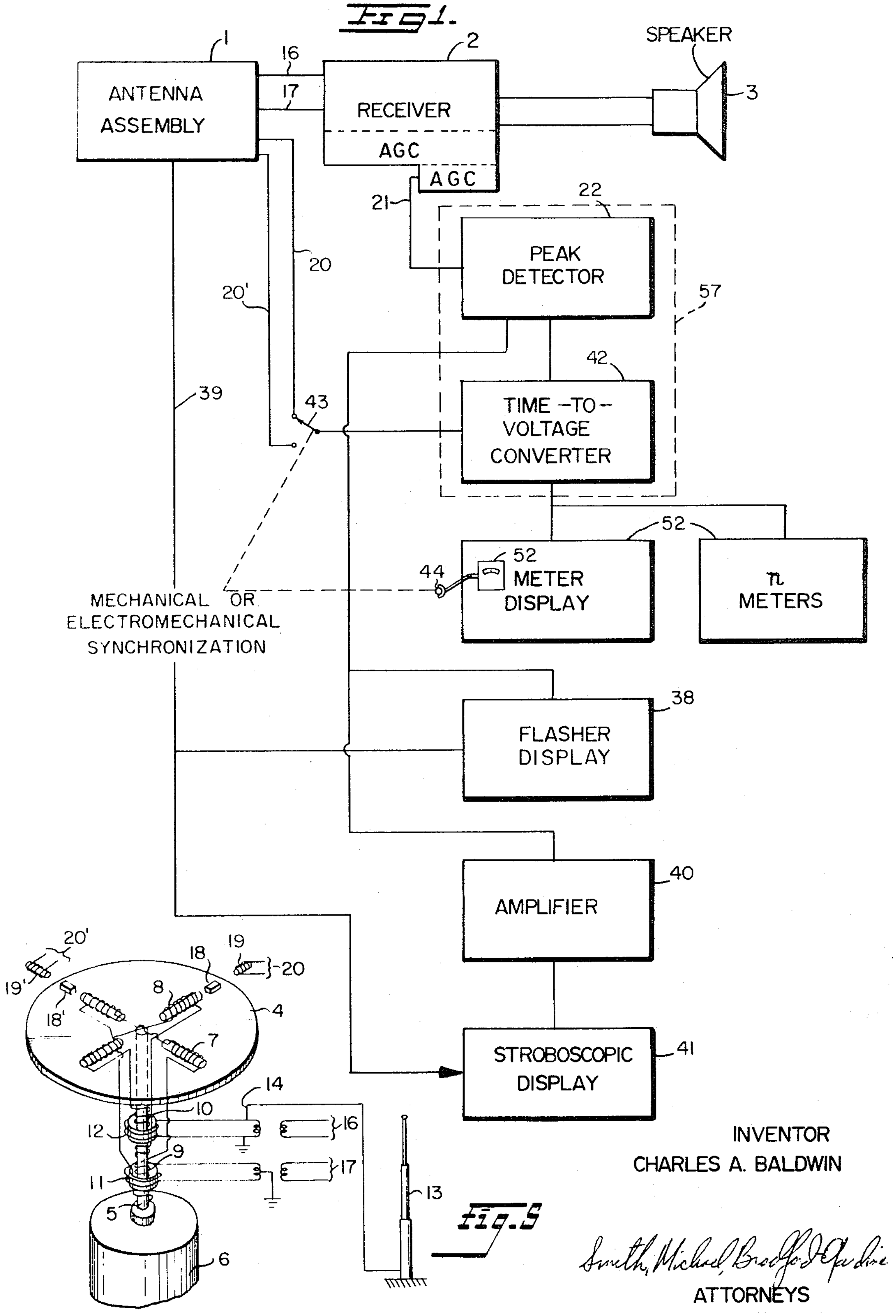
FIG. 1 is a block diagram of a radio direction finder constructed in accordance with this invention.
FIG. 5 is a diagrammatic perspective of a representative configuration for the antenna assembly of this invention.

Referring to the accompanying drawings, and particularly to FIG. 1, it can be seen that the apparatus of this invention comprises an antenna assembly 1, a receiver 2, a speaker 3, a null sensing means 57, and one or more readout devices. The antenna assembly 1 comprises a continuously rotating assembly more fully illustrated in FIG. 5.

The antenna assembly comprises a rotatable mounting base 4 operatively connected to a shaft 5 and continuously driven by a motor 6. The base 4 provides support for first and second loop antennas 7 and 8 respectively. Each antenna comprises a ferrite core on which antenna wire is wound, the two antennas being oriented with the core axes 90° to each other. In the preferred embodiment illustrated, the antennas cross at the center in order to maintain mechanical balance, but alternative arrangements which maintain a 90° horizontal orientation while preserving electrical isolation are acceptable. Leads from the respective antennas 7 and 8 are brought to a suitable point for pickoff by any conventional means, such as brushes, electrostatic means, or as here shown, an inductive pickoff. Specifically, each antenna is connected to a coil 9 and 10 respectively which coils are mounted for rotation with the shaft. Stationary pickoff coils 11 and 12 are inductively coupled to the respective shaft coils in a well-known manner to receive signals from the antennas and connect them to the inputs of receiver 2.

Figure 3:
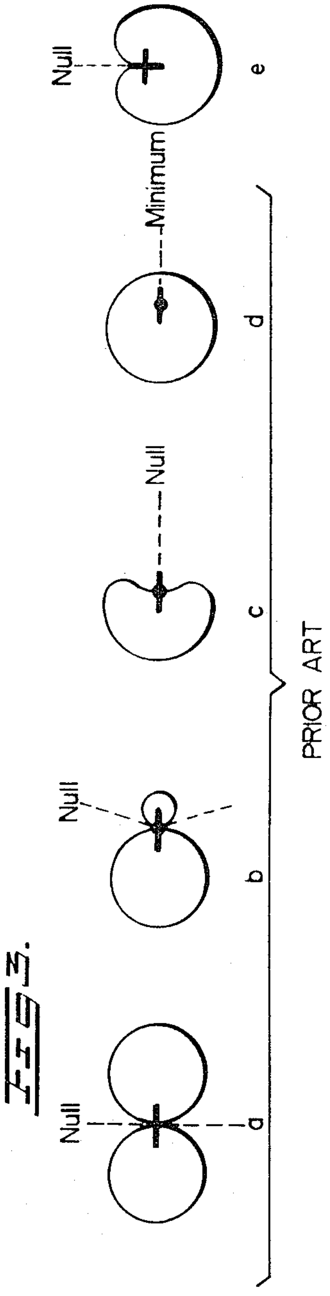

The theoretical response or field pattern of a conventional single loop antenna is illustrated in FIG. 3(*a*), which exhibits a null in two directions displaced 180° apart. It is known to resolve this ambiguity by the provision of a sense antenna which induces, with the loop antenna, a small voltage 90° out of phase with the voltage induced by the received signal in the sense antenna. Thus, there is provided a stationary vertical sense antenna 13 which has the effect of displacing the nulls of FIG. 3(*a*) with respect to each other. The resultant field strength patterns are shown in progressively greater degrees of sense antenna effects in FIGS. 3(*b*), 3(*c*) and 3(*d*). See, for instance, the discussion of sense antenna effect in Tyce U.S. Pat. No. 3,110,029, patented Nov. 5, 1963.

In this invention, the sense antenna 13 is connected only to the first-mentioned loop antenna 7, as through connection 14. The output of the second antenna 8, on the other hand, is balanced to ground, as at 15. Receiver 2 derives its inputs inductively as at 16 and 17. Inasmuch as first antenna 7 is influenced by sense antenna 13 to an appreciable degree, its characteristic response pattern is that of FIG. 3(*c*). The second antenna 8, however, is not characterized by sense antenna effect, and consequently retains the pattern of FIG. 3(*a*). Since the antennas of this preferred embodiment are physically oriented at 90° to each other, the resultant combined output of the two is that of FIG. 3(*c*) superimposed at 90° on that of FIG. 3(*a*), this result being illustrated at FIG. 3(*e*). As obvious from the diagram of FIG. 3(*e*), rotation of the antenna assembly will result in the production of one null only in 360° of antenna rotation, the null occurring when each antenna is simultaneously passing through its thus established null.

While the foregoing describes a preferred embodiment, it is obvious that a single loop antenna can be used with the direction finder of this invention where a 180° ambiguity in readout can be tolerated.

In the case of a meter-type readout of the bearing of a detected signal source (transmitting station) from the vehicle or other receiver location, it is necessary to synchronize the indicating system with antenna rotation in a manner to be described in the ensuing specification relating to this readout. For this purpose, the antenna assembly is provided with a pulse generator comprising a permanent magnet 18 carried by the base 4 at a point near its periphery. A stationary pickup coil 19 is located adjacent to the path of rotation of the magnet 18 whereby movement of the magnet 18 past the coil 19 induces a pulse of energy therein in accordance with well-known electrodynamic principles. The radial position of the magnet 18 with respect to the antennas 7 and 8 and of the pickup coil 19 with respect to the installation generally are chosen to provide a reference direction from which bearings are to be read. For instance, the reference would logically be the lubber line of a vehicle or the direction north in a fixed installation. A similar pulse generator assembly 18′, 19′, is displaced 90° from the first-mentioned pulse generator, thus providing a preferred sync pulse output at 20, and a substitute sync pulse output at 20'.

The receiver 2 is a conventional radio receiver modified to receive the two independent antenna inputs 16 and 17. It includes the conventional loudspeaker which can be used to identify a received signal as to the transmitting station of its origin. The retention of the speaker further enables the unit to be used in the manner of a conventional receiver for reception of weather information or other data of interest in the environment of use of this invention.

It is known to utilize an output from the automatic gain control of a receiver to derive a direction finding signal from a continuously rotating antenna. See, for instance, U.S. Pat. No. 3,231,890 issued Jan. 25, 1966 to J. R. Hoover.

In the apparatus of this invention, the receiver is further modified to provide an additional automatic gain control (AGC) circuit which is of conventional design but which has circuit parameters chosen to give a time constant which does not exceed the time consumed in 180° of antenna rotation at the established rotational speed. Thus at a preferred rotation of 1,800 r.p.m., the time constant of the additional AGC circuit should not exceed 17 milliseconds, whereas the conventional AGC circuit for the receiver itself is maintained at a time constant approximately 10 times that value.

Figure 2:
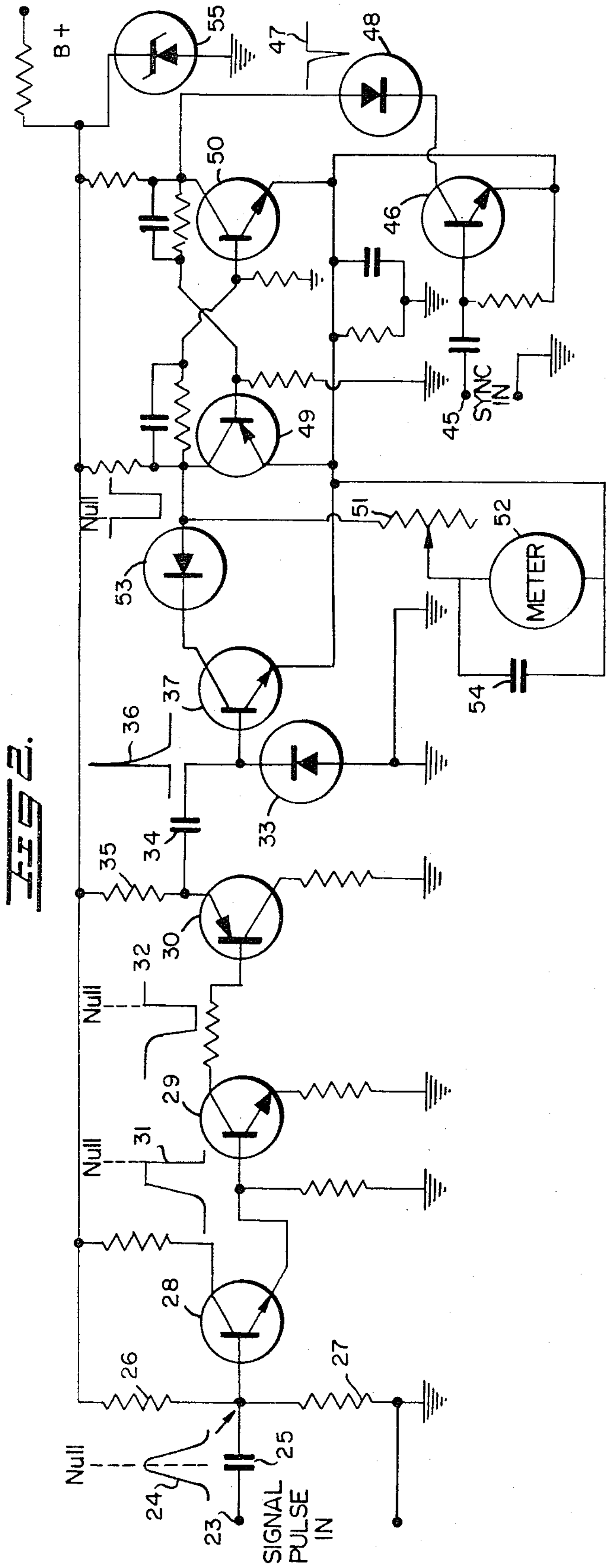
FIG. 2 is a schematic diagram of the circuitry of the null detector and time-to-voltage converter, FIGS. 3(*a*) thru (*d*) are diagrams of the directivity pattern of a prior art single loop antenna, FIGS. 3(*e*) is a directivity pattern of an antenna constructed in accordance with this invention.

The output of the additional AGC circuit comprises a voltage on the order of 2 volts peak derived from minimum usable signal strength at maximum antenna pickup, and is of a polarity whereby an increasing signal strength in the receiver results in an increasingly negative automatic gain control voltage. This output is connected through line 21 to a peak detector 22, the circuitry of which is disclosed in detail in FIG. 2. Here, the AGC signal appears at the peak detector input 23 as a waveform 24 comprising a positive pulse occurring as the null of the rotating antenna assembly passes the bearing of the point of transmission of a received signal.

The peak detector input circuit comprising capacitor 25 and resistors 26 and 27 provide a high impedance to reduce loading of the additional AGC circuit. This input circuit has a time constant approximately equivalent to 90° of antenna rotation.

Transistors 28 and 29 comprise amplifier-signal shapers having more than sufficient gain to saturate pulse forming transistor 30 at the minimum usable signal strength (i.e., peak detector input of 2 volts). Thus, at a point on the leading edge of waveform 24 which corresponds to the minimum usable signal, transistors 28, 29 and 30 saturate and level off as seen in waveforms 31 and 32. At this time, transistor 30 and diode 33 maintain capacitor 34 at ground potential. When the signal pulse 24 ceases to rise, the base of transistor 28 is returned to normal bias conditions by virtue of the voltage divider comprising resistors 26 and 27 acting in the absence of a charging signal through capacitor 25. Consequently, current ceases to flow in transistors 28, 29 and 30 resulting in the sharp trailing edge indicated in waveforms 31 and 32. Hence, capacitor 34 immediately charges through resistor 35, establishing a sharp positive spike 36 at the base of transistor 37. Thus, conduction is established in transistor 37 approximately 1 microsecond or 0.01° of antenna rotation after passage of the null. While this lag is generally considered negligible error, correction may be introduced by appropriate radial location of the synchronizing pulse generator 18, 19 on the antenna assembly whereby its orientation is displaced 0.01° from the actual reference line in the direction of antenna rotation. The output of the peak detector, hereinafter referred to as the detected signal pulse, may be read out with a variety of indicators.

For example, a flasher 38 may be mechanically or electromechanically synchronized with movement of the antenna as indicated by line 39 of FIG. 1. In this instance, a lamp is synchronously rotated through a circular path, the detected signal pulse causing it to flash at a point in its travel which corresponds to the bearing of the transmitting source of the signal. Such a readout is disclosed in more detail in the aforementioned U.S. Pat. Nos. 3,110,029 and 3,328,799.

Alternatively, the detected signal pulse may be amplified as at 40 used to flash a stroboscopic display 41. In a stroboscopic display, such as disclosed in U.S. Pat. No. 3,135,958 issued June 2, 1969 to J. W. Schwartz, a display disc including appropriate indicia is rotated in synchronism with antenna rotation, and is illuminated momentarily by a neon or zenon lamp triggered by the detected signal pulse. Other known indicators may be used, such as a cathode-ray tube as disclosed in U.S. Pat. No. 3,093,828 issued June 11, 1963 to S. L. Stutz.

While each of the foregoing indicators have the advantage of displaying more than one received station at one time, they are often difficult to read, particularly under conditions of high ambient light intensity. Consequently, a preferred embodiment involves a meter-type readout. In this embodiment, the time interval which is initiated by the reference pulse and terminated by the detected signal pulse is converted to an analogue voltage, the amplitude of which is representative of the elapsed time in that interval. This conversion is accomplished in the time-to-voltage converter 42 which receives a sync pulse from the selected pulse generator output 20 or 20'. Selection is determined by the setting of reference selector switch 43 which is ganged to the meter azimuth selector 44. The use of this selector is yet to be described.

Referring again to FIG. 2, the selected sync pulse is received at sync input 45 and amplified by transistor 46 and its associated conventional circuitry. Thus, as the antenna assembly passes the selected reference point, a negative pulse 47 is applied through diode 48 to a bistable multivibrator comprising transistors 49, 50. The sync pulse is effective to turn transistor 50 on and transistor 49 off. For calibration purposes, variable resistor 51 is set to provide full-scale deflection of meter 52 in this stable state of multivibrator operation. During normal operation, however, continued rotation of the antenna assembly will result in detection of a signal null at elapsed time representative of degree of antenna rotational travel and thus relative bearing of the received signal. As previously described, this results in saturation of transistor 37 and application of a pulse, through diode 53, to the multivibrator, thus reversing its state to the condition where transistor 49 is conducting and transistor 50 is off. In the nonconducting state of transistor 49, current in the calibrating resistor 51 and meter 52 is reduced to substantially zero. Capacitor 54, in combination with resistor 51 serves to integrate the on-off voltage fluctuations to provide a substantially direct current voltage proportional to the ratio of on to off time, which in turn is representative of the angular travel of the antenna assembly between the reference point and the detected signal. For an additional disclosure of a multivibrator used in a time-to-voltage converter with meter readout, reference is made to U.S. Pat. No. 2,412,111 issued Dec. 3, 1946 to W. S. Wilson.

Zener diode 55 is provided to maintain a constant supply voltage which stabilizes calibration of the meter 52.

The meter readout just described provides a zero to full-scale meter deflection for an established segment of antenna scan, which would be a full 360° when calibrated as described. While lesser segments of scan (always beginning at the selected reference point) could be adopted by appropriate calibration techniques, the use of the apparatus of this invention on mobile equipment would generally dictate a full 360° scan. In such use, a difficulty is experienced where the detected signal bearing is close to the reference direction, or lubber line, of the vehicle. Minor deviations in the course of the vehicle would cause the reference direction to swing from one to the other side of the detected signal resulting in full scale excursion of the meter needle from near zero to near 360° deflection. The constant motion of the needle would, of course, result in difficulty or impossibility of obtaining a meaningful reading.

Figure 4A:
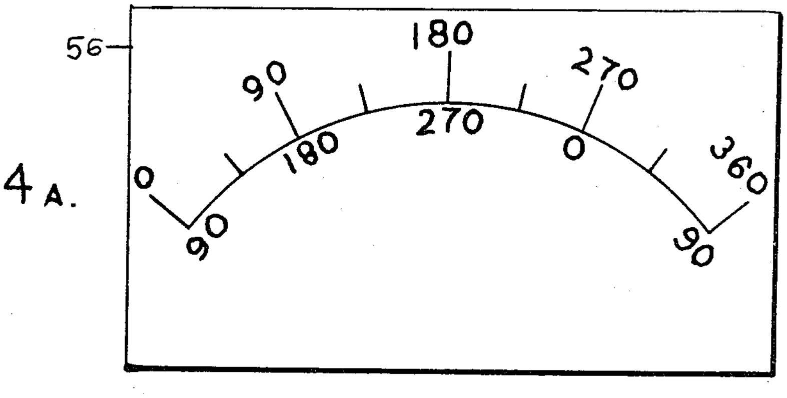
FIG. 4 is a meter face and mask employed with one embodiment of this invention.
Figure 4B:
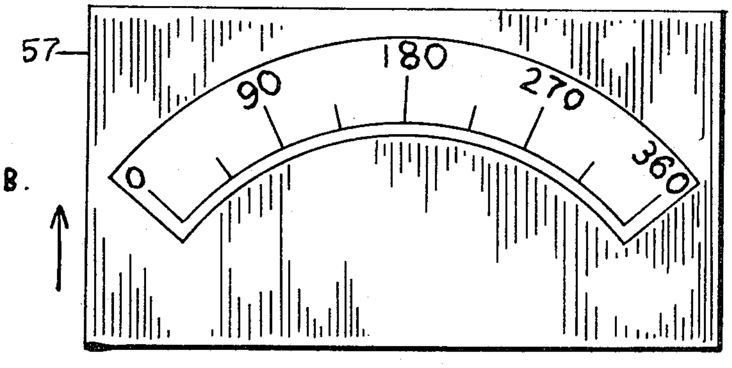
Figure 4C:
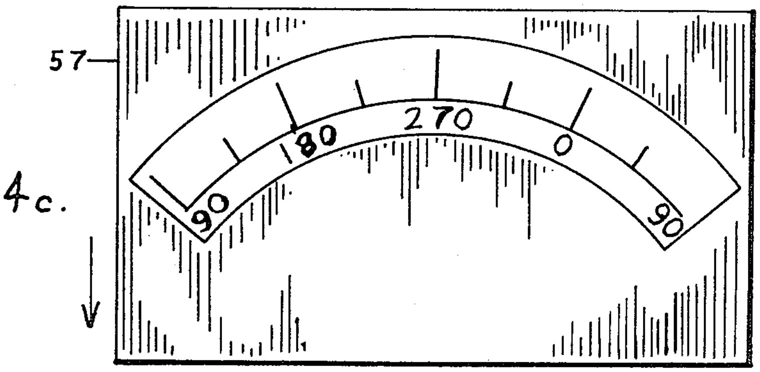

To avoid this difficulty, the meter face 56 is provided with two scales as indicated in FIG. **4*a*. As illustrated, the upper scale, which is the preferred scale, indicates a 0° signal bearing at 0 current, a 180° bearing at midscale, and a 360° signal bearing at full current. The lower scale, on the other hand, provides a 90° indication at 0 current, a 270° bearing at mid-scale, and excursion through 360° to 90° again at full scale deflection. The meter 52 is further provided with a mask 57 positioned in front of the scale and including a scale exposure opening dimensioned to expose only one of the aforementioned scales at one time. The mask 57 is movable between the position shown in FIG. 4***b* wherein the preferred upper scale is exposed and the position shown in FIG. 4*c* wherein the lower scale is exposed. Movement of the mask is controlled by the meter azimuth selector switch 44 shown diagrammatically in FIG. 1, and is thus ganged to operation of the reference selector switch 43.

During normal operation on either azimuth selector when the aforementioned difficulty of proximity of detected signal bearing and reference direction is encountered, it is merely necessary for the operator to shift the azimuth reference selector switch, thus changing the point of reference 90° between pulse generator output 20 and 20' and avoiding the difficulty of full scale needle excursions. Obviously, the alternative reference points could be at any angular relationship, with appropriate meter scale markings commensurate with that relationship. As a further alternative, a simpler indication could comprise an indicator, such as a pilot light, responsive to selection of the alternative reference point to indicate to the operator to add (or subtract) the appropriate number of degrees from the meter reading.

While the foregoing specification sets forth a preferred embodiment described in detail, the description is by way of illustration only, it being understood that the invention is defined in scope by the following claims and embraces any embodiments falling within the terms and spirit thereof.

I claim:

1. A radio-direction finding system comprising a continuously rotating assembly including a directional receiving antenna and a reference pulse generator, receiving means involving an input and an output, said input coupled to said antenna, peak detection means coupled to said receiving means output, a bistable multivibrator circuit including an output switchable between an ON mode and an OFF mode, means coupling said pulse generator to said multivibrator circuit and effective to switch said multivibrator to said ON mode, means coupling said peak detection means to said multivibrator and effective to switch said multivibrator circuit to an OFF mode, and integrating means coupled to said multivibrator output and effective to provide a signal varying in magnitude in direct proportion to the ratio of said ON time to said OFF time, and readout means effective to provide an indication of said magnitude.

2. A radio direction finding system as set forth in claim 1 wherein said rotating assembly includes at least a pair of reference pulse generators angularly spaced in azimuth from each other, said readout means comprises a meter including at least a pair of ranges, and azimuth reference selector means effective to select one of said reference pulse generators.

3. A radio direction finding system as set forth in claim 2 wherein said azimuth reference selector means is further effective to indicate the applicable one of said meter ranges in accordance with the selected reference pulse generator.

4. A radio direction finding system as set forth in claim 1 wherein said receiving means output comprises an automatic gain control circuit characterized by a response time constant not exceeding the elapsed time of one-half revolution of said continuously rotating antenna.

5. A radio direction finding system as set forth in claim 4 wherein said time constant is on the order of 17 milliseconds.

6. A radio direction finding system as set forth in claim 4 wherein said output automatic gain control circuit is independent of the conventional receiver automatic gain control circuit, and wherein the time constant of said output AGC circuit is on the order of one-tenth of the time constant of said receiver AGC circuit.

* * * * *